(12) United States Patent  
Shimizu

(10) Patent No.: US 7,004,589 B2  
(45) Date of Patent: Feb. 28, 2006

(54) LIQUID CRYSTAL PROJECTOR

(75) Inventor: Hitoshi Shimizu, Saitama (JP)

(73) Assignee: Fujinon Corporation, Saitama (JP)

( * ) Notice: Subject to any disclaimer, the term of this patent is extended or adjusted under 35 U.S.C. 154(b) by 105 days.

(21) Appl. No.: 10/867,728

(22) Filed: Jun. 16, 2004

(65) Prior Publication Data

US 2005/0237498 A1 Oct. 27, 2005

(30) Foreign Application Priority Data

Jul. 10, 2003 (JP) .............................. 2003-195098

(51) Int. Cl.  
  *G03B 21/14* (2006.01)

(52) U.S. Cl. ..................... 353/100; 353/33; 353/119; 349/5; 349/58

(58) Field of Classification Search ............... 353/31, 353/33, 34, 37, 100, 101, 119; 349/5, 7, 349/8, 9, 58  
See application file for complete search history.

(56) References Cited

U.S. PATENT DOCUMENTS

| 6,226,055 | B1 * | 5/2001 | Koba ........................... 349/5 |
| 6,609,796 | B1 * | 8/2003 | Maki et al. .................. 353/31 |
| 6,890,079 | B1 * | 5/2005 | Okuyama et al. ........... 353/100 |
| 2003/0025844 | A1 * | 2/2003 | Suzuki ......................... 349/5 |

* cited by examiner

*Primary Examiner*—William C. Dowling  
(74) *Attorney, Agent, or Firm*—Arnold International; Bruce Y. Arnold

(57) ABSTRACT

A liquid crystal projector of three-color type has three liquid crystal elements for modulating three primary color light bundles into three color optical images respectively. A recombination prism combines modulated three color optical images, and a projection lens system projects the combined full-color image on a screen. The projection lens system is constituted of the front lens group and the first and second rear lens groups. The front lens group and the rear lens groups are mounted to frames that are formed integrally on a prism base plate to which the recombination prism is fixed.

6 Claims, 5 Drawing Sheets

LIQUID CRYSTAL PROJECTOR

FIELD OF THE INVENTION

The present invention relates to a liquid crystal projector is provided with three panels of liquid crystal elements for modulating light bundles of three primary colors, i.e. blue, green and red, into three color optical images, wherein the three color optical images are combined to display a full-color image on a screen.

BACKGROUND ARTS

The liquid crystal projector is mainly constituted of a light source, color separating optical elements, such as a dichroic mirror, liquid crystal elements, a color recombination prism, a projection lens. White light from the light source is separated through the color separation optical elements into light bundles of three primary colors. The three color light bundles are directed to the three liquid crystal elements respectively. The liquid crystal elements modulate the three color light bundles and output the modulated light bundles as optical images of three primary colors to the recombination prism, where the three color optical images are combined into a full-color optical image. The combined optical image is projected through the projection lens onto a screen, so the image is displayed on the screen. There are two types of liquid crystal projector: one uses reflective liquid crystal elements, and the other uses transmissive liquid crystal elements. In either type, a full-color image is displayed on the basis of three color optical images that are produced by the optical modulation at the liquid crystal elements.

As mentioned above, the projection lens is for projecting the combined optical image onto the screen. Since the fineness of images to be projected on the screen is getting higher these days, the projection lens is required to have a correspondingly high resolving power. In addition, for a rear-projection type projector that projects images from behind the screen, the projection lens is expected to be a wide-angle lens as having a shorter projection distance. The wide-angle projection lens is desirable also for the sake of minimizing the whole size of the projector.

However, because the projector using the reflective liquid crystal elements needs a polarizing beam splitter prism in addition to the color recombination prism, the distances between the projection lens and the liquid crystal elements are inevitably large. This is disadvantageous for the sake of widening the angle of the projection lens.

As a solution to this problem, it has been suggested mounting a front lens group and a rear lens group of the projection lens separately from each other in a projector. Because it is difficult to adjust the positions of the front and the rear lens groups to each other, and also because it is hard to increase the number of lens elements of the rear lens group, the front and the rear lens groups are conventionally held in their individual holders, and these lens holders are mounted on a prism base plate that holds the recombination prism.

In order to achieve adequate quality of the projected images, the positions of the front and rear lens holders on the prism base plate must be accurately adjusted not only in an axial direction but also in a vertical direction to the base plate. For this reason, the assembling process of the projection lens has been difficult.

SUMMARY OF THE INVENTION

In view of the foregoing, a primary object of the present invention is to provide a liquid crystal projector that can be easy to assemble, and achieves high quality of the image on the screen.

To achieve the above and other objects, the present invention provides a liquid crystal projector that comprises first to third liquid crystal elements for modulating light beams of three primary colors to output three color optical images respectively; a rectangular recombination prism for combining the three color optical images into an optical image, the prism receiving the three color optical images on first and second side surfaces that are perpendicular to each other, wherein a combined optical image exiting from a third side surface of the prism; a projection lens system for projecting the combined optical image toward a screen, the projection lens system comprising a front lens group, a first rear lens group and a second rear lens group; a prism base plate on which a bottom side of the prism is fixed; and first, second and third frames formed integrally with the prism base plate in parallel to and in opposition to the first to the third side surfaces of the prism respectively, each of the first to the third frames having an opening, wherein the first rear lens group is held in the opening of the first frame, the second rear lens group is held in the opening of the second frame, and the front lens group is held in the opening of the third frame.

According to a preferred embodiment, the liquid crystal projector further comprises a plate member that is formed in parallel to and in opposition to a fourth side surface of the prism, wherein the first to the third frames and the plate member are coupled to each other to form an integral rectangular tube.

According to the present invention, the front lens group and the rear lens groups are mounted to the frames that are formed on the prism base plate to which the color recombination prism is fixed. Therefore, the lens elements of the projection lens can be easy to mount without the need for any complicated fine adjustment. Because the projection lens is constituted of the front lens group and the first and the second rear lens groups, it is possible to correct the respective color images through the rear lens groups. So the full-color image projected on the screen can achieve a high quality.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
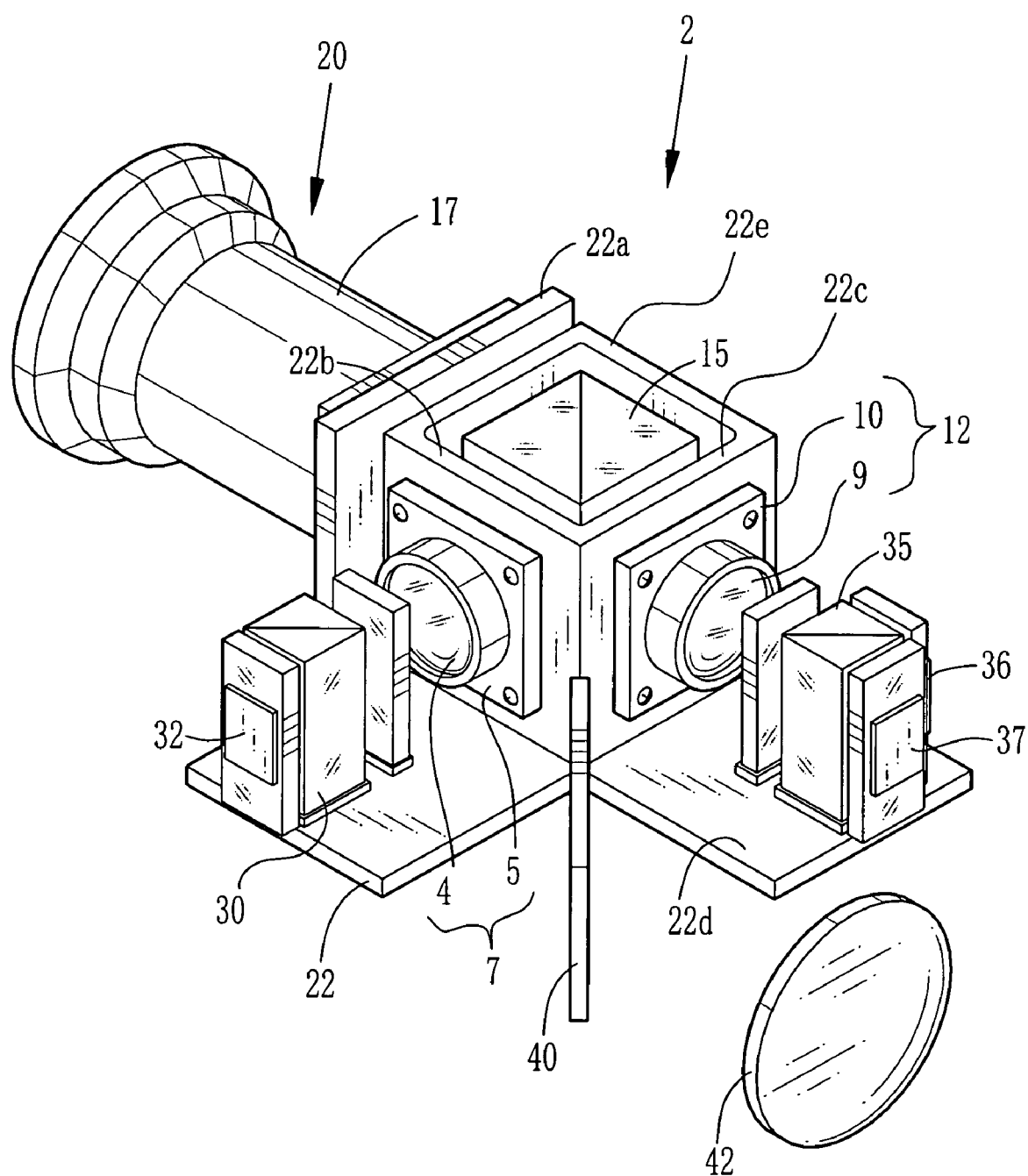
FIG. 1 is a perspective diagram illustrating relevant parts of a liquid crystal projector according to an embodiment of the invention.

In a liquid crystal projector 2 shown in FIG. 1, a first rear lens unit 7 consists of a first rear lens group 4 held in a holder 5, a second rear lens unit 12 consists of a second rear lens group 9 held in a holder 10, and a front lens unit 20 consists of a front lens group 60 (see FIG. 2) held in a lens barrel 17. These lens units 7, 12 and 20 are mounted on a base body 22.

The base body 22 consists of a prism base plate 22d having a smooth surface, three frames 22a, 22b and 22c, and a plate member 22e. A base surface of a rectangular recombination prism 15 is fixed to the prism base plate 22d. The first to third frames 22a to 22c and the plate member 22e are placed in opposition to and in parallel to four side surfaces of the recombination prism 15 respectively. The first to third frames 22a to 22c and the plate member 22e are coupled to each other to form a rectangular tube.

The first rear lens group 4 includes a number of lens elements whose optical axes are adjusted previously when their positions are fixed in the holder 5. The second rear lens group 5 has the same structure as the first rear lens group 4, and optical axes of its lens elements are adjusted previously when their positions are fixed in the holder 10.

The front lens group 60 includes a number of lens elements whose optical axes are adjusted previously when they are mounted in the lens barrel 17. The lens barrel 17 is screwed to the third frame 22a of the base body 22. The holder 5 holding the first rear lens group 4 is screwed to the first frame 22b, and the holder 10 holding the second rear lens group 9 is screwed to the second frame 22c.

Figure 2:
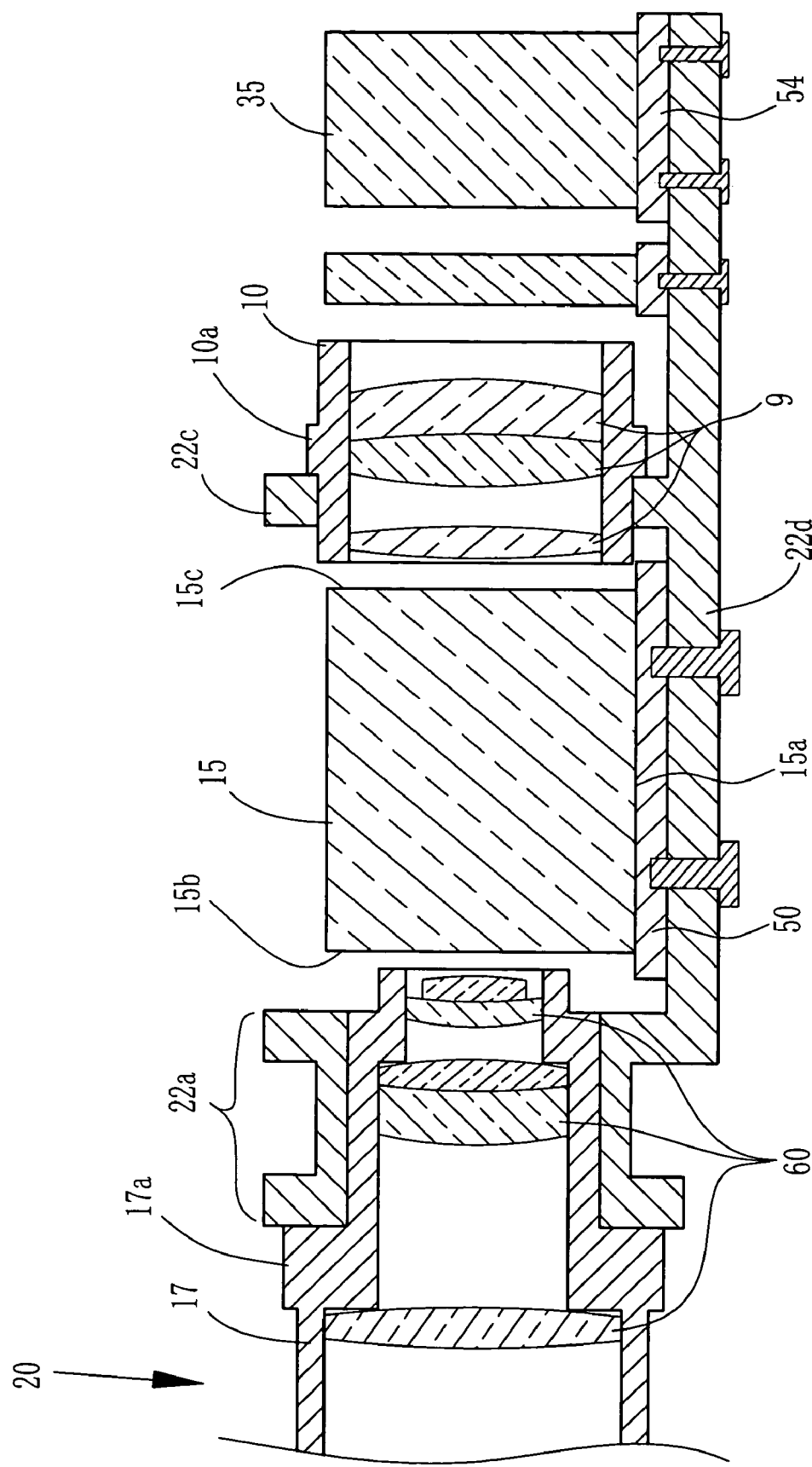
FIG. 2 is a sectional view of the liquid crystal projector of FIG. 1, taken along a vertical plane to a prism base plate that includes an optical axis of a front lens group.
Figure 3:
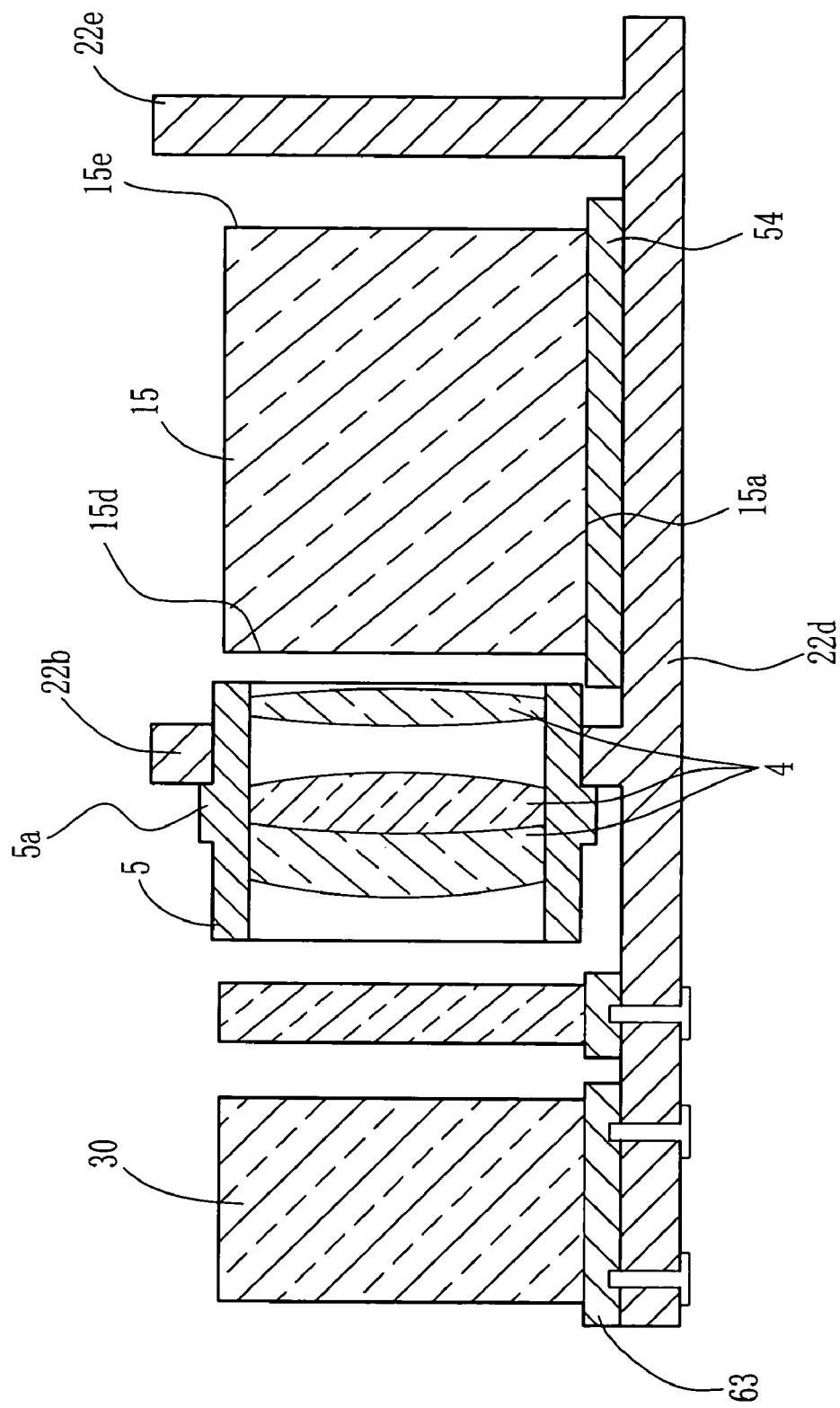
FIG. 3 is a sectional view of the liquid crystal projector of FIG. 1, taken along a vertical plane to a prism base plate that includes an optical axis of a first rear lens group.

As shown in more detail in FIGS. 2 and 3, the first rear lens group 4 is opposed to a first polarizing beam splitter prism 30, hereinafter called briefly the first PBS prism 30, that is opposed to a reflective liquid crystal element 32. The second rear lens group 9 is opposed to a second polarizing beam splitter prism 35, hereinafter called briefly the second PBS prism 35, that is opposed to reflective liquid crystal elements 36 and 37.

Blue light from a color separation mirror 40 falls in the first PBS prism 30, whereas yellow light from the color separation mirror 40 falls in the second PBS prism 35. A not-shown integrator and a condenser lens 42 are disposed between the color separation mirror 40 and a not-shown light source. The condenser lens 42 condenses the light beam from the integrator.

The first frame 22b is opposed to a first side surface 15d of the recombination prism 15, and the first side surface 15d receives a blue optical image thereon. The second frame 22b is opposed to a second side surface 15c that borders the first side surface 15d, and the second side surface 15c receives a red optical image and a green optical image thereon. The third frame 22a is opposed to a third side surface 15b of the recombination prism 15, and an optical image combined through the recombination prism 15 exits from the third side surface 15b. The plate member 22e is opposed to a fourth side surface 15e of the recombination prism 15.

The bottom surface 15a of the recombination prism 15 adheres to a base member 50, and the base member 50 is screwed to the prism base plate 22d. The second PBS prism 35 adheres to a base member 54, and the base member 54 is screwed to the prism base plate 22d. The first PBS prism 30 adheres to a base member 63, and the base member 63 is screwed to the prism base plate 22d.

The lens barrel 17 holding the front lens group 60 is formed with a flange 17a around its outer periphery in the vicinity of one end. After the end of the lens barrel 17 is fitted in an opening of the third frame 22a, the flange 17a is screwed to the third frame 22a, though it is not shown in the drawings. Thereby, the front lens group 60 is opposed to the third side surface 15b of the recombination prism 15. The holder 10 of the second rear lens group 9 is substantially cylindrical and formed with a square flange 10a. The flange 10a is screwed at its four corners to the second frame 22c after one end of the holder 10 is fitted in an opening of the second frame 22c. Thereby, the second rear lens group 9 is opposed to the second side surface 15c of the recombination prism 15. The holder 5 of the first rear lens group 4 is substantially cylindrical and formed with a square flange 5a. The flange 5a is screwed at its four corners to the first frame 22b after one end of the holder 5 is fitted in an opening of the first frame 22b. Thereby, the first rear lens group 4 is opposed to the second side surface 15d of the recombination prism 15.

Figure 4:
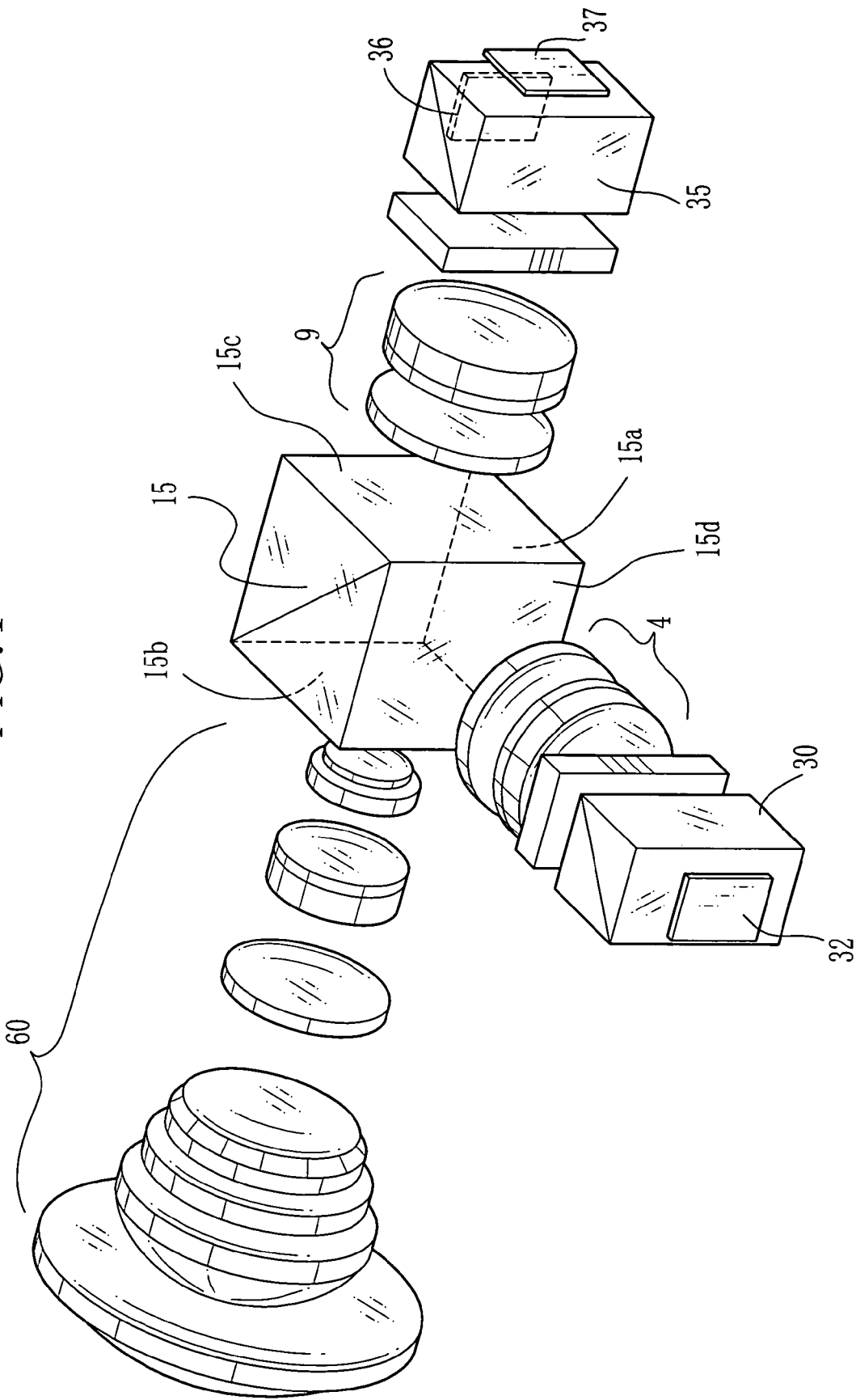
FIG. 4 is a perspective diagram illustrating an optical system of the liquid crystal projector of FIG. 1.

Now the operation of the liquid crystal projector will be described with reference to its optical system shown in FIG. 4.

The front lens group 60, the first rear lens group 4 and the second rear lens group 9 constitute a projection lens of the liquid crystal projector. The optical axis of the front lens group 60 is perpendicular to the optical axis of the first rear lens group 4, whereas the optical axis of the second rear lens group 9 coincides with the second rear lens group 9.

White light from the light source, that may be a xenon lamp, is equalized in intensity through the integrator, and is condensed through the condenser lens 42, before falling on the color separation mirror 40. The color separation mirror 40 separates the white light into blue and yellow light beams, and directs the blue light to the first PBS prism 30, and the yellow light to the second PBS prism 35.

The blue light is refracted through the first PBS prism 30, and falls on the liquid crystal element 32. Through the liquid crystal element 32, the blue light is modulated into a blue optical image, and is directed through the first PBS prism 30 to the first rear lens group 4. The second PBS prism 35 separates the yellow light into green and red light beams. The red light is directed to the liquid crystal element 36, and the green light is directed to the liquid crystal element 37. The liquid crystal element 36 modulates the red light into a red optical image and outputs it to the second PBS prism 35, which then directs the red optical image to the second rear lens group 9. The liquid crystal element 37 modulates the green light into a green optical image and outputs it to the second PBS prism 35, which then directs the green optical image to the second rear lens group 9.

The blue optical image is directed through the first rear lens group 4 to the first side surface 15d of the recombination prism 15, while the red and green optical images are directed through the second rear lens group 9 to the second side surface 15c of the recombination prism 15. The recombination prism 15 combines these three color optical images to output a combined optical image from the third side surface 15b. The optical image from the third side surface 15b is projected through the front lens group 60 toward a screen, so the full-color image is displayed on the screen.

As described so far, in the liquid crystal projector according to the present invention, the front lens unit and the rear lens unit are mounted to the frames that are formed on the prism base plate to which the color recombination prism is fixed. Therefore, the lens elements of the projection lens can be easy to mount, having no need for any complicated fine adjustment. Because the projection lens is constituted of the front lens group and the first and second rear lens groups, it is possible to correct the respective color images through the rear lens groups. So the full-color image projected on the screen can achieve a high quality.

Figure 5:
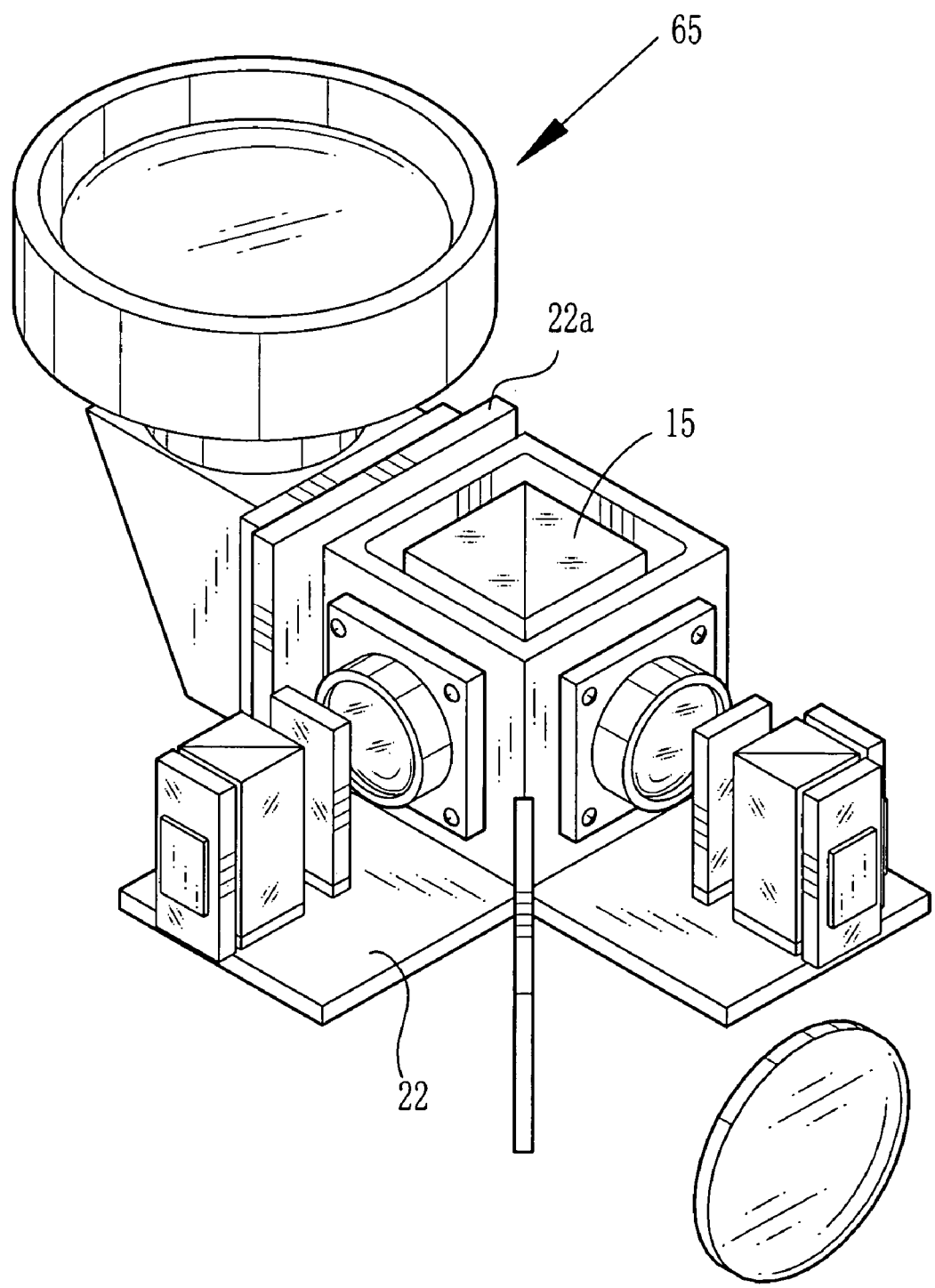
FIG. 5 is a perspective diagram illustrating relevant parts of a liquid crystal projector according to a second embodiment of the invention, wherein a front lens unit has a refracted optical axis.

In the above embodiment, the optical axis of the front lens group extends along a straight-linear line. It is alternatively possible to use a front lens unit 65 as shown in FIG. 5, whose optical axis is refracted by a mirror disposed in between lens elements.

Thus, the present invention is not to be limited by the above embodiments, but various modifications will be possible within the scope and sprit of the appended claims.

What is claimed is:

1. A liquid crystal projector comprising:

first to third liquid crystal elements for modulating light beams of three primary colors to output three color optical images respectively;

a rectangular recombination prism for combining said three color optical images, said prism receiving said three color optical images on first and second side surfaces that are perpendicular to each other, and letting a combined optical image exit from a third side surface thereof;

a projection lens system for projecting said combined optical image toward a screen, said projection lens system comprising a front lens group, a first rear lens group and a second rear lens group;

a prism base plate on which a bottom side of said prism is fixed; and first, second and third frames formed integrally with said prism base plate in parallel to and in opposition to said first to third side surfaces of said prism respectively, each of said first to said third frames having an opening, wherein said first rear lens group is held in said opening of said first frame, said second rear lens group is held in said opening of said second frame, and said front lens group is held in said opening of said third frame.

2. A liquid crystal projector as claimed in claim 1, further comprising a plate formed in parallel to and in opposition to a fourth side surface of said prism, wherein said first to third frames form an integral rectangular tube in connection to said plate.

3. A liquid crystal projector as claimed in claim 1, wherein said first rear lens group is fixedly mounted in a first holder, and said first holder is fitted in said opening of said first frame, and is fixed to said first frame, whereas said second rear lens group is fixedly mounted in a second holder, and said second holder is fitted in said opening of said second frame, and is fixed to said second frame.

4. A liquid crystal projector as claimed in claim 3, wherein said front lens group is fixedly mounted in a lens barrel, and said lens barrel is fitted in said opening of said third frame and is fixed to said third frame.

5. A liquid crystal projector as claimed in claim 1, wherein said liquid crystal elements are reflective.

6. A liquid crystal projector as claimed in claim 1, wherein said first rear lens group projects a first color optical image from said first liquid crystal element onto said first side surface of said prism, whereas said second rear lens group projects second and third color optical images from said second and said third liquid crystal elements onto said second side surface of said prism.

* * * * *